Feb. 2, 1937.   T. A. COHEN   2,069,576
APPARATUS FOR PRODUCING PHOTOGRAVURE PLATES
Filed March 23, 1932   3 Sheets—Sheet 1
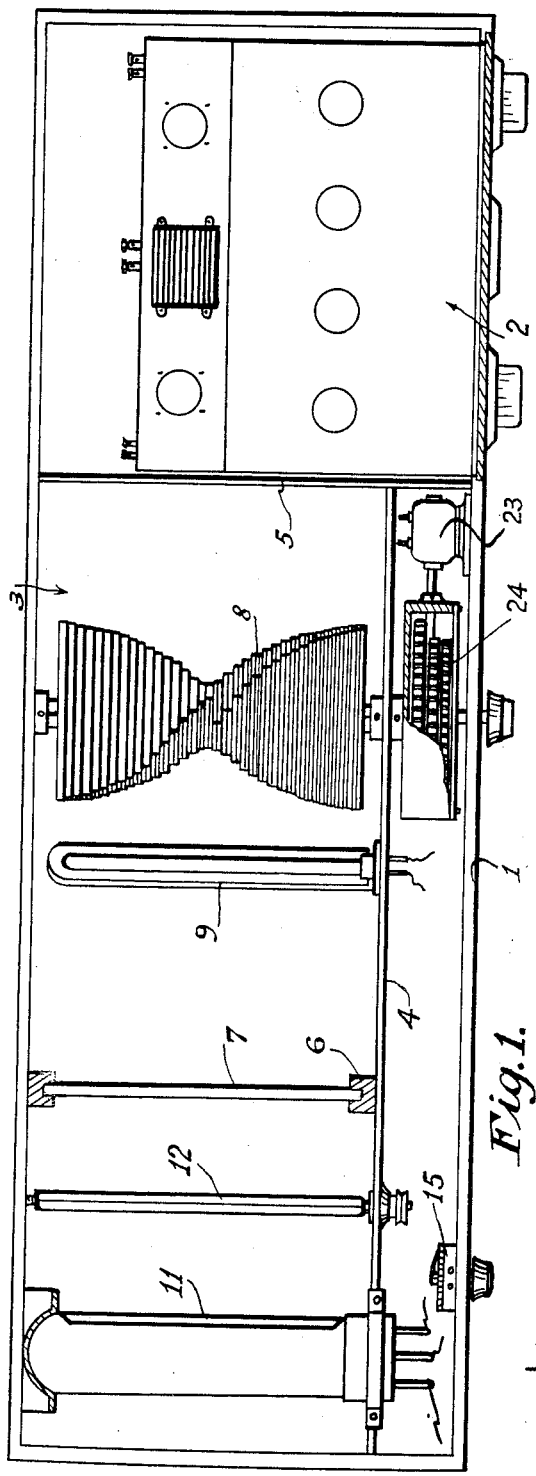
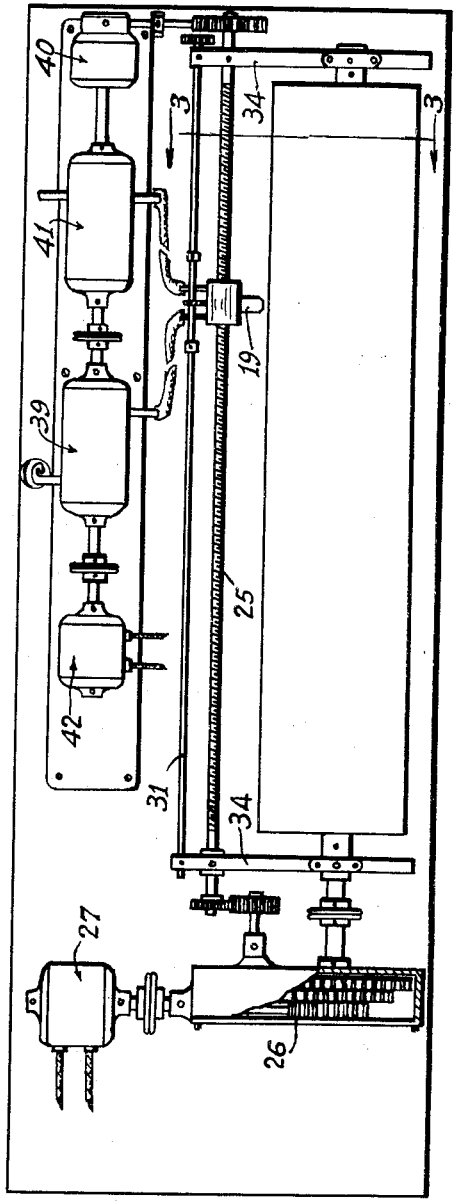
INVENTOR.
Theodore A. Cohen.
BY Theodore W. Miller
ATTORNEY.

Feb. 2, 1937.	T. A. COHEN	2,069,576
APPARATUS FOR PRODUCING PHOTOGRAVURE PLATES
Filed March 23, 1932	3 Sheets-Sheet 2
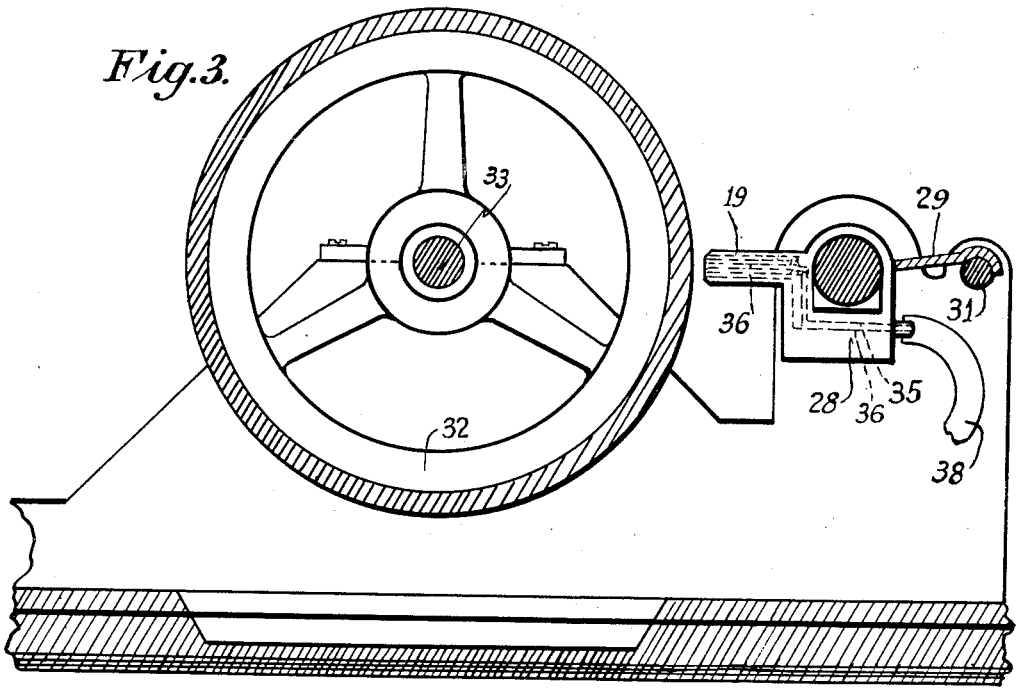
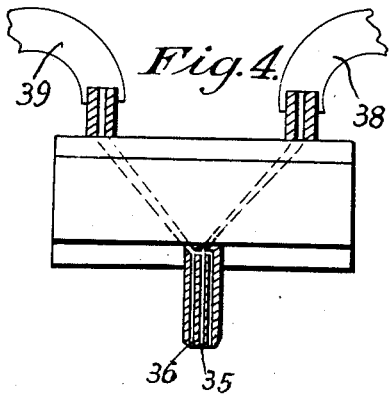
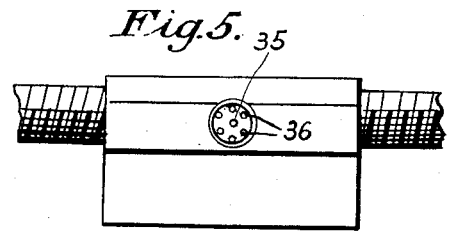
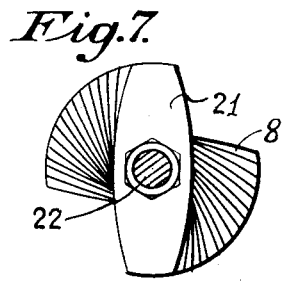
INVENTOR.
Theodore A. Cohen.
BY Theodore W. Miller
ATTORNEY.

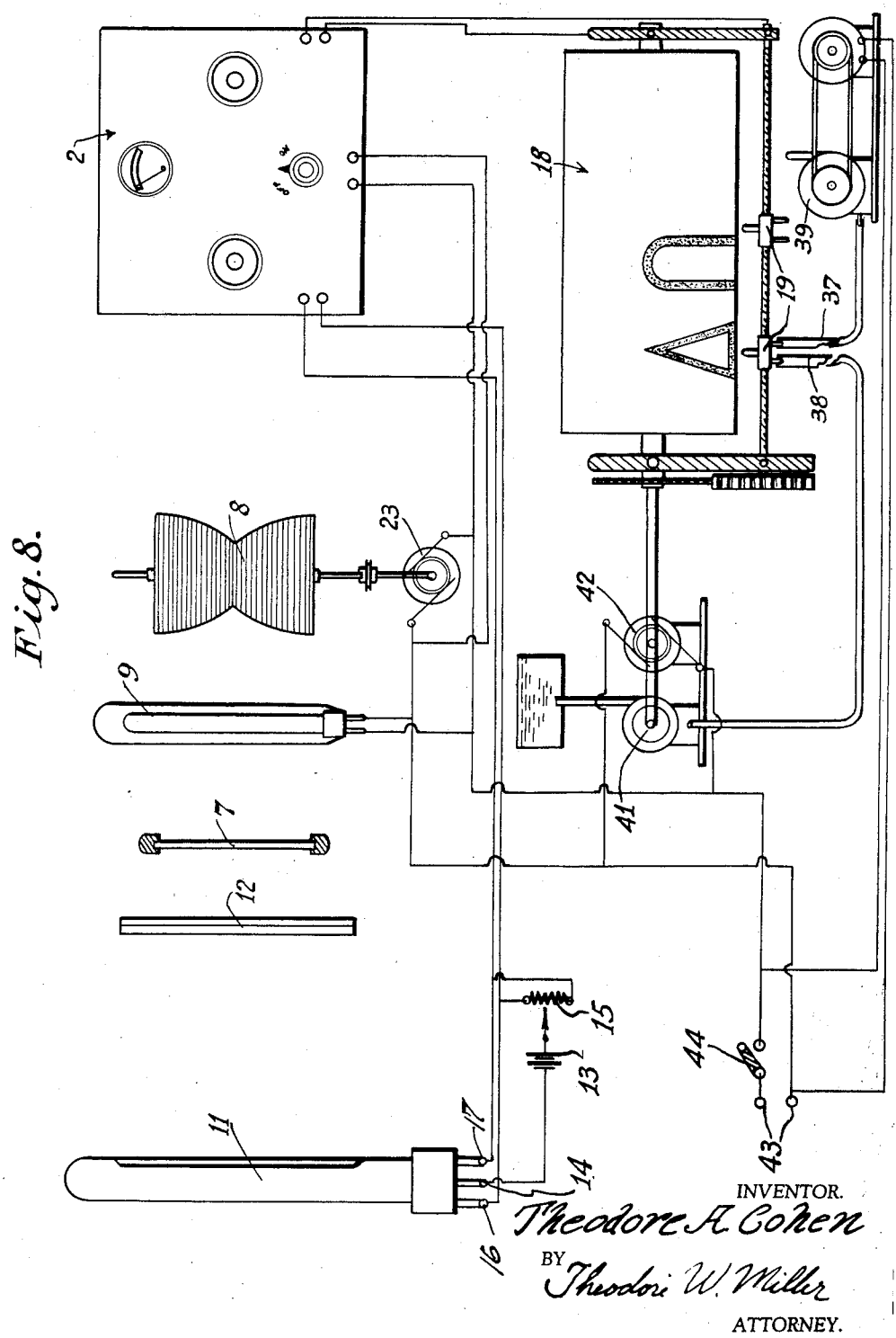

Patented Feb. 2, 1937

2,069,576

UNITED STATES PATENT OFFICE 2,069,576

APPARATUS FOR PRODUCING PHOTOGRAVURE PLATES

Theodore A. Cohen, Chicago, Ill.

Application March 23, 1932, Serial No. 600,721

8 Claims. (Cl. 178—5)

This invention relates to a method and apparatus for producing photogravure cylinders and plates.

The primary object of this invention is to provide a method and apparatus of the above character wherein the image to be reproduced is engraved upon a cylinder or plate in an efficient manner.

More particularly it is an object of this invention to provide such an apparatus and method wherein the image to be reproduced is engraved upon the cylinder or plate electro-chemically.

Other and further objects of this invention will be apparent as the same becomes better understood from an examination of the specification and claims in conjunction with the accompanying drawings wherein:

Fig. 1 is a horizontal view with parts removed showing the portion of the apparatus for controlling an electric circuit;

Fig. 2 is a similar view showing the portion of the apparatus controlled by said circuit for engraving the image on the photogravure cylinder or plate;

Fig. 3 is an enlarged sectional view taken at the line 3—3 of Fig. 2;

Fig. 4 is a plan detail view partly in section of the stylus used in the electro-chemical engraving;

Fig. 5 is an inner side view of same;

Fig. 6 is an enlarged view of one of the plates of which the mirror is made;

Fig. 7 is an end view partly in section showing the mirror;

Fig. 8 is a schematic and diagrammatic view showing the electrical connections.

Referring to the drawings more particularly, reference character 1 designates a cabinet containing a suitable amplifier apparatus 2 at the rear end thereof. Forward of the amplifier 2 is a compartment 3 formed by partitions 4 and 5 and the cabinet walls. The front end of the compartment 3 is provided with a slotted frame 6 adapted to removably receive a photographic plate 7. A composite mirror 8 is journalled transversely in the walls of the compartment 3 so as to systematically direct rays of light coming from a reflector 9 across the plate 7.

An elongated housing 11 containing a photoelectric cell (not shown) of the type disclosed in my copending application Ser. No. 474,542 filed August 11, 1930, is removably supported by partition 4 so as to receive the light rays after they have passed through the plate 7 and are converged by a lens 12. This lens 12 is supported at either end by suitable bearings.

As shown in Fig. 8 the photo-electric cell within the housing 11 is in circuit with the input of the amplifier apparatus 2 whereby the fluctuations corresponding to variations in opaqueness of the photographic plate are amplified. A balanced voltage from a source 13 connected on its negative side to contact 14 of the cell and at its positive side to variable resistance 15 across contacts 16 and 17 of said cell is delivered to the cell. This voltage may be unbalanced according to the principles of said copending application.

The output circuit of the amplifier 2 containing stronger but corresponding fluctuations is delivered to the engraving apparatus which will be hereinafter described, the positive terminal of the amplifier output being connected to rotogravure plate 18 and the negative terminal to engraving styluses 19. The amount of current flowing from cylinder to stylus determines the depth of the engraving as will be hereinafter explained.

The light rays reflected from the mirror 8 are systematically directed over the plate 7 by virtue of the particular character of the mirror and the manner in which it is controlled and the styluses 19 together with the rotogravure cylinder are so relatively controlled that each stylus is relatively moved with respect to the cylinder exactly similarly to the lateral shift of the light rays directed through the plate 7, with the result that an image is engraved on the rotogravure cylinder which is exactly similar to the image on said plate.

The reflector 9 contains a suitable light and is adapted to direct a plane of light toward the axis of the mirror 8.

The mirror 8 comprises a multiplicity of plates 21 apertured and mounted on a shaft 22. These plates 21 are each blackened along one longitudinal edge and each end edge, one longitudinal edge being polished.

The plates 21 are each positioned an equi-angular distance apart from each other successively. The shaft 22 on which the mirror is mounted is connected to a reduction gear mechanism 24 driven by a synchronous motor 23. As the motor 23 rotates the mirror shaft, the polished edges of the respective mirror plates 21 are successively operated to direct rays of light from the reflector 9 vertically from bottom to top across the plate 7, the rays sweeping the plate 7 in succession and their paths spaced increments apart, the same as the plates 21 which caused them, so that when the mirror 8 has been rotated one revolution the rays of light will have swept systematically over the entire area of the plate 7.

The rotogravure cylinder 18 is mounted in parallel relation with a stylus carrying screw 25 both of which parts are connected to gearing 26 and synchronous driving motor 27 therefor the latter motor being in circuit with the synchronous motor 23 whereby the peripheral movement of the cylinder 18 will be at a fixed ratio in proportion to the vertical sweeping movement of the light rays from the mirror 8.

Each stylus 19 is provided with an integral carriage portion 28 threadedly mounted on the screw 25 and provided with a rearwardly extending supporting member 29. The free end of member 29 is in sliding engagement with a supporting rod 31. The cylinder 18 is mounted on a drum 32 the shaft 33 of which is journaled in supports 34 which also support screw 25 and rod 31. Screw 25 moves the stylus to the right a proportionate increment with each revolution of the drum 18, the total increments of lateral movements of the stylus being the same in number as there are mirror plates 21.

Each stylus is provided with a central passage 35 adapted to deliver a fine jet or spray of a saturated solution of copper sulphate or other salts against the cylinder during relative movement of stylus and cylinder.

The current flowing from cylinder to stylus during operation of the apparatus, electrolytic action will cause copper to be removed from the cylinder in proportion to the flow of current whereby an image will be engraved in the cylinder exactly similar to that on the photographic plate 7.

A series of passages 36 are arranged in each stylus around the central passage 35 thereof to deliver a cylindrical spray of air around the spray of solution to blow the solution away after it strikes the cylinder and to confine the effective point of contact between stylus and cylinder to the point where the spray from passage 35 contacts said cylinder. These passages 36 are connected together and are adapted to receive air from a flexible coupling 37 leading to an air compressor 39. The passage 35 is connected to a flexible coupling 38 leading to a liquid pump 41. The pump 41 and compressor 39 are each coupled together and to a synchronous motor 42. All of the motors are driven from and the light in reflector 9 is connected to a common source (not shown) connected to contacts 43 and adapted to be connected by closing a switch 44.

The operation and advantages of the aforedescribed method and apparatus will be apparent without further details reference having been made to my copending application Ser. No. 474,542.

I am aware that many changes may be made and details varied without departing from the principles of this invention, and I therefore do not wish to be limited to the details shown or described.

I claim:

1. In an apparatus of the character described, the combination of a member adapted to have an image produced thereon and means for delivering an electrolytic chemical solution to said member at a minute position and means for dispersing said solution immediately surrounding said position on said member for causing electrolytic action on said member for producing said image on said member.

2. In an apparatus of the character described, the combination of a member adapted to have an image produced thereon and means for delivering a fine stream of an electrolytic chemical solution and a surrounding stream of air to said member for causing electrolytic action on said member for producing said image on said member.

3. In an apparatus of the character described, the combination with a substance simulating an image, of a member adapted to have said image reproduced thereon, electrolytical means controlled by said substance for causing the removal of particles from said member and means for causing movement of said first means relative to said member to systematically cover a portion thereof to cause reproduction of said image on said member.

4. In an apparatus of the character described, the combination with a substance simulating an image, of a member adapted to have said image reproduced thereon, means in an electric circuit controlled by said substance for delivering a chemical solution to said member for causing the removal of particles therefrom by electrolysis and means for causing movement of said first means relative to said member to systematically cover a portion thereof to cause reproduction of said image on said member.

5. In an apparatus of the character described, the combination with a substance simulating an image, of a member adapted to have said image reproduced thereon, means adapted to receive current from said member and provided with means for electrically contacting the same through the intermediary of a confined portion of a chemical solution, means for controlling said current in accordance with said substance for causing the removal of particles from said member and means for causing movement of said first means relative to said member to systematically cover a portion thereof to cause reproduction of said image thereon.

6. In an apparatus of the character described, the combination with a substance simulating an image, of a member adapted to have said image reproduced thereon, means in an electric circuit controlled by said substance for delivering a chemical solution to said member at a minute position and for dispersing said solution immediately surrounding said position for causing the removal of particles from said member and means for causing movement of said first means relative to said member to systematically cover a portion thereof to cause reproduction of said image thereon.

7. In an apparatus of the character described, the combination with a substance simulating an image of a member adapted to have said image reproduced thereon and means for delivering a fine stream of a chemical solution and a surrounding stream of air to said member for causing the removal of particles from said member and means for causing movement of said first means relative to said member to systematically cover a portion thereof and means controlled by said substance and cooperating with said two means to cause reproduction of said image.

8. In an apparatus of the character described, the combination with a substance simulating an image, of a member adapted to have said image reproduced thereon, means in an electrical circuit for spraying a chemical solution on said member whereby said circuit, the same including said solution and member may be completed, means for controlling said circuit in accordance with variations in said substance over an organized succession of points thereon and means in synchronism with the last means for causing relative movement between said spray means and member to cause reproduction thereon of said image.

THEODORE A. COHEN.